United States Patent [19]

Stuttler et al.

[11] Patent Number: 5,027,219
[45] Date of Patent: Jun. 25, 1991

[54] APPARATUS AND METHOD FOR CONVERTING PICTURES OR IMAGES INTO VIDEO SIGNALS

[75] Inventors: Herbert Stuttler, Rankweil; Josef Wolf, Feldkirch; Wolfgang Held, Hard, all of Austria; Max Mai, Ingolstadt, Fed. Rep. of Germany

[73] Assignee: Josef Wolf Audio-Visuals, Götzis, Austria

[21] Appl. No.: 417,579

[22] Filed: Oct. 5, 1989

[30] Foreign Application Priority Data

| Oct. 5, 1988 | [DE] | Fed. Rep. of Germany ... 8812552[U] |
| Feb. 1, 1989 | [DE] | Fed. Rep. of Germany ... 8901098[U] |
| Mar. 23, 1989 | [DE] | Fed. Rep. of Germany ....... 3909665 |
| Jun. 6, 1989 | [CH] | Switzerland ......................... 2124/89 |

[51] Int. Cl.⁵ .......................................... H04N 5/238
[52] U.S. Cl. .................................... 358/228; 358/229; 358/230; 358/225

[58] Field of Search ............... 358/225, 479, 230, 231, 358/215, 60, 214, 216, 217, 241, 209, 185, 229, 228, 227

[56] References Cited

U.S. PATENT DOCUMENTS

| 3,816,654 | 6/1974 | Brightman | 358/108 |
| 3,833,758 | 9/1974 | Ferrari | 358/225 |
| 4,755,869 | 7/1988 | Tanaka | 358/231 |

Primary Examiner—Howard W. Britton
Assistant Examiner—Michael H. Lee

[57] ABSTRACT

A camera, together with a light source, is pointed by means of a mirror system at a projection surface which lies on the apparatus or adjacent to it. Transmitted light pictures, such as slides, can be placed in front of the light source, the said pictures thus being reproduced on the projection surface and being recorded from there. Instead of such projected images, it is possible to illuminate and record articles. Connecting two pieces of apparatus with one another, each apparatus having a monitor, provides a universal video telephone.

26 Claims, 3 Drawing Sheets

APPARATUS AND METHOD FOR CONVERTING PICTURES OR IMAGES INTO VIDEO SIGNALS

The invention relates to an apparatus for converting pictures or images into video signals.

BACKGROUND OF THE INVENTION

The term "pictures or images" is understood as meaning both pictures in the conventional sense, such as photographs, slides, drawings, etc., and other information records, such as pages of text, written items, etc., as well as living or dead objects.

Such known pieces of apparatus usually have a housing, a video camera with a lens, and a light source, which are generally fixed, in the form of a plurality of lamps, to flexible supports and serve for illuminating the picture or object; in a known apparatus, a mirror is located before the video camera in order to deflect the beam into the video camera. Consequently, the camera may point upwards, and a smaller height is possible. A light source in the sense of the invention produces predominantly visible light.

Thus, in the known pieces of apparatus, pictures are recorded by a video camera and are then reproduced on a screen or recorded or otherwise further processed in a known manner.

The disadvantage is that the known pieces of apparatus have only poor image definition. Furthermore, the illumination is generally very difficult to adjust so that there is frequently reflection on the pictures or the occurrence of shadows, which interferes with reproduction. In addition, heating of the lamps leads to disadvantages with regard to operation; contact with the lamps may cause burns. It is difficult to point the video camera at a desired point in the picture and to reduce or enlarge the latter, so that, in various known pieces of apparatus, orientation aids, such as light beams or the like, have to be projected onto the picture to permit orientation, for example on maps, and the lamps constantly have to be readjusted to achieve uniform illumination. This means additional expense and is not user-friendly.

PRIOR ART

British Patent No. 1,572,151 furthermore discloses a reading and display apparatus which records a script for a television announcer via a video camera and displays it on a monitor for the television announcer. The recording apparatus has a horizontally installed video camera which is pointed at the script via deflecting mirrors. Simple lamps illuminate the script. Since the rays from the lamp strike the script completely randomly and without any special orientation, an operator at the recording apparatus cannot determine which passage has actually just been recorded by the video camera. Furthermore, the mirror arrangement in front of the video camera very greatly restricts the actual field of action for video recording. Areas to the sides of the apparatus cannot be recorded. The apparatus also cannot project transmitted-light pictures or the like which are subsequently intended to be recorded by the video camera.

In a further known construction according to U.S. Pat. No. 3,816,654, projection of a transmitted-light picture or of a sharply focused light beam of white light is also impossible. The camera provided for the apparatus according to the U.S. patent can therefore record only articles, scripts or people exposed to an unfocusable infrared light beam. Both the infrared light beam and the line of sight of the camera are each deflected by a mirror, with the result that the distance of the object being viewed can be increased only by an insignificant extent. However, this is not a disadvantage for the main application of the apparatus according to the U.S. patent, since as a rule this apparatus is in fact intended to be used for an intercom system where, as a rule, the person to be recorded is always a certain desired distance away from the camera. However, for good reproduction of documents, colored photographs or the like, the infrared light envisaged in the U.S. patent is insufficient. Because of the relatively large angle between the line of sight and the video camera and the infrared light beam of the light emitting diodes, there is also presumably undesirable formation of shadows during the attempted recording of articles.

OBJECTS AND STATEMENTS OF THE INVENTION

It is therefore the object of the invention to provide an improved apparatus which does not have the above-mentioned disadvantages and is user-friendly. Furthermore, it should be possible to select any picture sections, which should also be illuminated optimally and automatically when recorded by the video camera. It should be possible for an operator to recognize directly on the picture which section has been recorded by the video camera. The image definition should be so high that it is even possible to produce sharply focused images of articles.

This object is achieved for the first time in a satisfactory manner, according to the invention, by the combination of the following features:

a projection surface for showing an image;

a video camera having a recording field for taking said image and for converting it into video signals;

first lens means for forming an image conjugated from that on said projection surface onto said recording field of said video camera;

a source of visible light for illuminating said projection surface;

first mirror means in front of said video camera for deflecting a first beam of light having a first central ray reflected from said projection surface towards said video camera;

second lens means arranged after said source of light for forming a second beam having a second central ray to be focused over a predetermined distance from said second lens means onto said projection surface;

second mirror means between said first mirror means and said projection surface for receiving said second beam from said source of light via said first mirror means and for deflecting said second beam towards said projection surface, while receiving said first beam reflected from said projection surface and deflecting said first beam via said first mirror means towards said video camera; and means for adjustably mounting at least one of said first and second mirror means.

The second lens serves, similarly to the lens of the camera, for focusing the light beams, but in a second beam path which intersects the beam path of the camera. For the purpose of the invention, intersection also means crossing a small distance apart, the apparatus functioning best if the central rays intersect in the area of the picture or article. This ensures optimal illumination of the picture or article. Projection surface is understood as meaning any surface onto which the light rays, with or without their own image content, can be projected and which can be selected randomly by swivelling the second mirror and from which the picture or image is recorded by the video camera. It can be located on or adjacent to the housing, for example on a table surface or wall surface, or may be formed by the surface of any living or dead object.

Thus, a particular area of a projection surface is found with the camera more or less automatically by swivelling the second mirror, which simultaneously deflects the light beam to precisely this area, this being clearly visible to an operator. The person thus orients the recording location of the camera in a non-random way by pointing the light beam at a certain area on the projection surface. The mirror combination consisting of the first and second mirrors simultaneously lengthens the light path from the picture to the lenses, with the result that good image definition can be achieved, which is otherwise possible only by means of excessively long lenses. Above a light path of about 90 cm., the image definition corresponds to the requirements most frequently encountered.

Further objects are achieved by the following further advantageous features of the invention:

Said first and second beams lie in a common plane and intersect one another at a point of intersection within a region of said projection surface at a predetermined angle of intersection of less than 25 degrees.

Said angle of intersection is less than 5 degrees, particularly less than 2 degrees.

Said first and second lens means have identical optical parameters.

The apparatus further comprises aperture forming means between said light source and said second lens means for covering said recording field of said video camera by said conjugated image.

Said aperture forming means comprise third lens means.

The apparatus further comprises light amplifier means.

The apparatus further comprises synchronizing means interconnecting said first and second lens means for synchronized adjustment of said first and second lens means.

Said synchronizing means comprise gear means including a direction changing gear wheel.

Said second mirror means and at least one of said mirror parts are adjustably mounted.

The apparatus further comprises remote control means for said second mirror means and at least one of said mirror parts.

The apparatus further comprises optical adjusting means.

Said optical adjusting means comprise at least one means selected from the group consisting of an autofocus means, an autoiris means, a measuring means for measuring statuses within a region of said projection surface, lens control means, control means for said source of light, and deflection control means.

The apparatus further comprises housing means enclosing at least said video camera, said light source and said first mirror means, and mirror carrying means connected to said housing means and carrying said second mirror means, said projection surface being formed on said housing means.

Said mirror carrying means comprise a telescopic arm.

Said housing means comprise releasable fastening means for exchangeably holding said projection surface.

By choosing the point of intersection in the region of the projection surface, there is optimal coincidence of the cross-sections of the two beam paths on the projection surface, with the result that there is also coincidence between the illuminated area and the area recorded by the camera. The angle between the central rays of, preferably, less than 5°, in particular less than 2°, produces the best illumination with the least consumption of energy, and an angle of only about 1.5° has also been successfully used. The fact that the lenses are identical ensures that these good effects are obtained even with different lens settings. By means of suitable deflecting constructions for the light rays, it is also possible, according to the invention, to provide only a single lens, through which the two central rays are guided.

A third lens increases the independence of the cross-section of the second beam path at its beginning from that of the first beam path, which is designed for the recording element, for example, the CCD; the image congruence can thus be advantageously influenced. Contrary to the known technique in projectors, the projection image, for example a slide, will first be reduced. It is thus possible to ensure that projection surfaces can be chosen any distance away, with constant image definition, despite a prefocused second lens. The projected light is completely directed at the picture to be recorded. In addition, inaccuracies in any slides can be corrected without having to alter the position of the zoom lens, whose focus is set, for example, to a fixed distance, for example to the upper side of the housing, in a constructed apparatus at a distance of 1.3 m. In the normal position, the distance between the intermediate image of the third lens and that of the second lens corresponds to the base dimension of the video camera.

These advantages are underlined in particular by the following features:

At least one of said first and second lens means comprise adjustable focusing means.

At least one of said first and second lens means comprise zooming means.

The zoom lens facilitates enlargement of individual picture sections. In the case of a light source with low luminous power, a light amplifier can achieve improved recording quality, which may be important in particular in the following variant with the television projector:

The apparatus further comprises holding means in the path of said second beam for holding a transparent image carrier to be illuminated by said second beam.

The provision of an aperture in front for selecting a picture section is a cheaper but more power-consumptive variant for selecting good image congruence.

The use, according to the invention, of synchronized zoom lenses ensures image congruence even in the case of very different picture sections and, particularly in the case of remote control, makes the apparatus easier to operate. The same effect does of course also occur when a single lens is used. The use of a gear with a direction-changing gearwheel saves components, motors and controls and affords considerable operational reliability.

Said first mirror means comprise first and second mirror parts, said first mirror part receiving said first beam and said second mirror part receiving light from said light source. This feature permits various additional effects, such as the finding of any areas on a relatively large illuminated projection surface; in such a case, the two zoom lenses should be capable of being operated separately from one another. Moreover, it allows the point of intersection or the angle between the two central rays to be adjusted regardless of the distances between the projection surface and the lenses, so that the said point of intersection or angle always comes to rest in the plane of the projection surface, which promotes lateral image congruence. The three-dimensional adjustment of the mirror or mirrors also allows the projection surface to be moved, virtually without distortion, to any positions outside the housing, close to a plane at 45 degrees to the plane of the first mirror through the fixing point of the second mirror; however, there is also increasing distortion.

An autofocus means and/or an autoiris means ensure user-friendly control of recording with a video camera. A concomitant third beam path can be provided for a very wide range of applications, for example in connection with a control unit for measuring certain statuses in the region of the projection surface and/or for controlling the lenses and/or the the light source, such as focusing, distance measurement, bright/dark monitoring, etc.

The variant with the control unit facilitates brightness control of the video camera, the evaluation unit and the control unit being provided for adaptation of the iris setting to an altered lens setting. The computer compares the determined actual values of the evaluation control with the specified normal values for the camera, determines in this way the percentage values of overexposure or underexposure and subsequently ensures that the particular overexposure or underexposure values are maintained at the projection surface. Thus, subjectively selected brightness variants can be retained, even in the case of enlarged or reduced picture sections. This is not the case in conventional autoiris means, since these search for the standard brightness value for the camera immediately after a new zoom setting of a picture section.

The variant with a trigger mechanism for the—optionally delayed—switching off of the light source or for the automatic swivelling of one of the mirrors is a sort of safety device for protecting the video camera or CCD element and is intended to prevent damage to the CCD element through deliberate or unintentional direction of the second beam path directly into the first beam path. Thus, overexposure results in the light source being switched off.

The inclusion of a transparent image carrier and/or a filter serves for conditioning the content of the second beam path, which in principle in many cases contains merely a white light beam, in order to illuminate an article or a picture on a projection surface. Image carriers are understood as meaning slides, films, transmitted-light LCDs, etc.

The transmission of a picture from an image carrier to projection surface allows the user to vary this image on the projection surface by, for example, providing information with a pointer or by preparing drawings on the projection surface itself or on a paper or a transparent foil in the projection area of the second beam path, the said drawings thus coinciding with the projected image. "Painting" on image carriers—without actually altering the image carriers—is thus possible only with the invention.

If, however, the light source is in the form of a television projector, it is also possible to project, alter or document and reproduce any video pictures or, for example, computer screens. If required, it is even possible to make multiple overlays, so that the pictures to be newly recorded represent a combination of, for example, the television picture with a slide and with a handwritten entry. In such a case, however, a residual light amplifier is inserted in between to ensure the brightness for recording. It is also possible to insert an additional lens in front in order to focus all images sharply.

When the light source is used as an external additional apparatus outside the housing, there is the advantage that a very wide variety of pieces of apparatus can be chosen for this purpose. The deflection mirror for orienting the second beam path can, for example, also be in the form of a half-silvered mirror or a prism, so that it is also possible to choose this variant in addition to those described above. However, such a deflection mirror can also be provided in the case of an integral light source and may be in the form of an IR-transparent mirror, in order to reduce heat radiation, which can lead to local heating, particularly in the third lens. Various filters are used for coloring the light beam or for reducing the IR or the UV radiation.

The variant in which the apparatus further comprises holding means in the path of said second beam for holding a transparent image carrier to be illuminated by said second beam is compact and, from the external appearance, is similar to conventional bright-room projectors, so that users very rapidly become familiar with the method of operation. The video camera, the light source and the first mirror are also well protected there. The projection surface on the upper side of the housing is a definable surface; moreover, it is directly opposite the second mirror, with the result that there is very little distortion during projection. The interchangeability of the plate with two different reflection surfaces serves as a high-contrast background, which has to be adapted in each case, for all projections or for supporting different articles to be recorded. Colored background boards, which, for example, may also consist of colored paper, can be used for this purpose.

The embodiment in which said predetermined distance from said second lens means onto said projection surface is at least 0.9 meters offers good image definition even with conventional zoom lenses, so that even three-dimensional articles can be reproduced well. In practice, pieces of apparatus with a distance of 1 or 1.3 m. have been constructed, having excellent image definition. In conventional pieces of apparatus, it would be necessary to use close-up lenses, which are inconvenient to change.

It is of course also possible for an apparatus according to the invention to be operated exclusively as a recording apparatus—without the light source switched on—or exclusively as a projection apparatus without the video camera switched on. In the former case, other recording apparatus can also be used as video cameras, for example, cameras, movie cameras, etc.

The variant in which the apparatus further comprises holding means in the path of said second beam for holding a transparent image carrier to be illuminated by said second beam allows considerable flexibility and variety of potential uses of the apparatus according to the invention. However, it is of course also possible for the light source to be connectable in a known manner as an external additional apparatus outside the housing, in which case a deflection mirror for deflecting the second beam path into the second lens is provided, preferably inside the housing.

An appliance according to the invention for communication purposes comprises a first apparatus including:

a projection surface for showing an image to be converted into video signals, a video camera having a recording field for taking said image and for converting it into video signals, first lens means for forming an image conjugated from that on said projection surface onto said recording field of said video camera, a source of visible light for illuminating said projection surface, first mirror means in front of said video camera for deflecting a first beam of light having a first central ray reflected from said projection surface towards said video camera, second lens means arranged after said source of light for forming a second beam having a second central ray to be focused over a predetermined distance from said second lens means onto said projection surface, and second mirror means between said first mirror means and said projection surface for receiving said second beam from said source of light via said first mirror means and for deflecting said second beam towards said projection surface, while receiving said first beam reflected from said projection surface and deflecting said first beam via said first mirror means towards said video camera, at least one of said first and second mirror means being adjustably mounted so as to be able to illuminate a user positioned in front of said first apparatus, said first apparatus further including a monitor; and a second apparatus identical with said first apparatus, wherein said video camera of said first apparatus is electrically connected to a monitor of said second apparatus, while a video camera of said second apparatus is electrically connected to said monitor of said first apparatus.

The appliance further comprises telephony-type coupling means for electrically connecting said first and second pieces of apparatus.

Conventional video telephones will be revolutionized by these measures, in that users will be able not only to see themselves but also to display documents or articles during a telephone conversation, and these features furthermore make it possible to show a user how his transmitted picture appears to other users.

The apparatus according to the invention further comprises a video monitor electrically connected to said video camera. The apparatus further comprises housing means for enclosing at least part of said apparatus including said video camera, said light source and said first mirror means, and connecting them to said second mirror means and said projection surface, said video monitor being flat and being movably connected to said housing means to be moved between an operating position and a rest position. These features describe a particularly compact apparatus which can be brouht into a protected, readily transported position by swivelling the monitor and/or the mirror, the variant with a partly transparent mirror allowing the user to look himself more or less directly in the eye, with optimal dazzle-free illumination, particularly in the case of video telephones.

The method for recording and/or playback of an image via a video apparatus according to the invention has been recognized as thoroughly feasible in many tests. Deflecting the first beam via the second mirror results in a greater distance between the lens and the projection surface, with the result that good image definition is more easily achieved even with simple lenses. The achievement of positioning the point of intersection on the projection surface results in optimal illumination and prevents dazzling of the camera. The apparatus according to the invention indicates variants with possible image combinations, i.e. with possibilites for direct inscription on, for example, slides. Restriction of the intermediate image serves for adapting image projection to image recording, so that simple commerical, identical lenses can be used as the first and second lens.

DESCRIPTION OF THE DRAWINGS

The invention is illustrated in detail, by way of example, with reference to the Figures.

DETAILED DESCRIPTION OF PREFERRED EMBODIMENTS

Figures 1, 2:
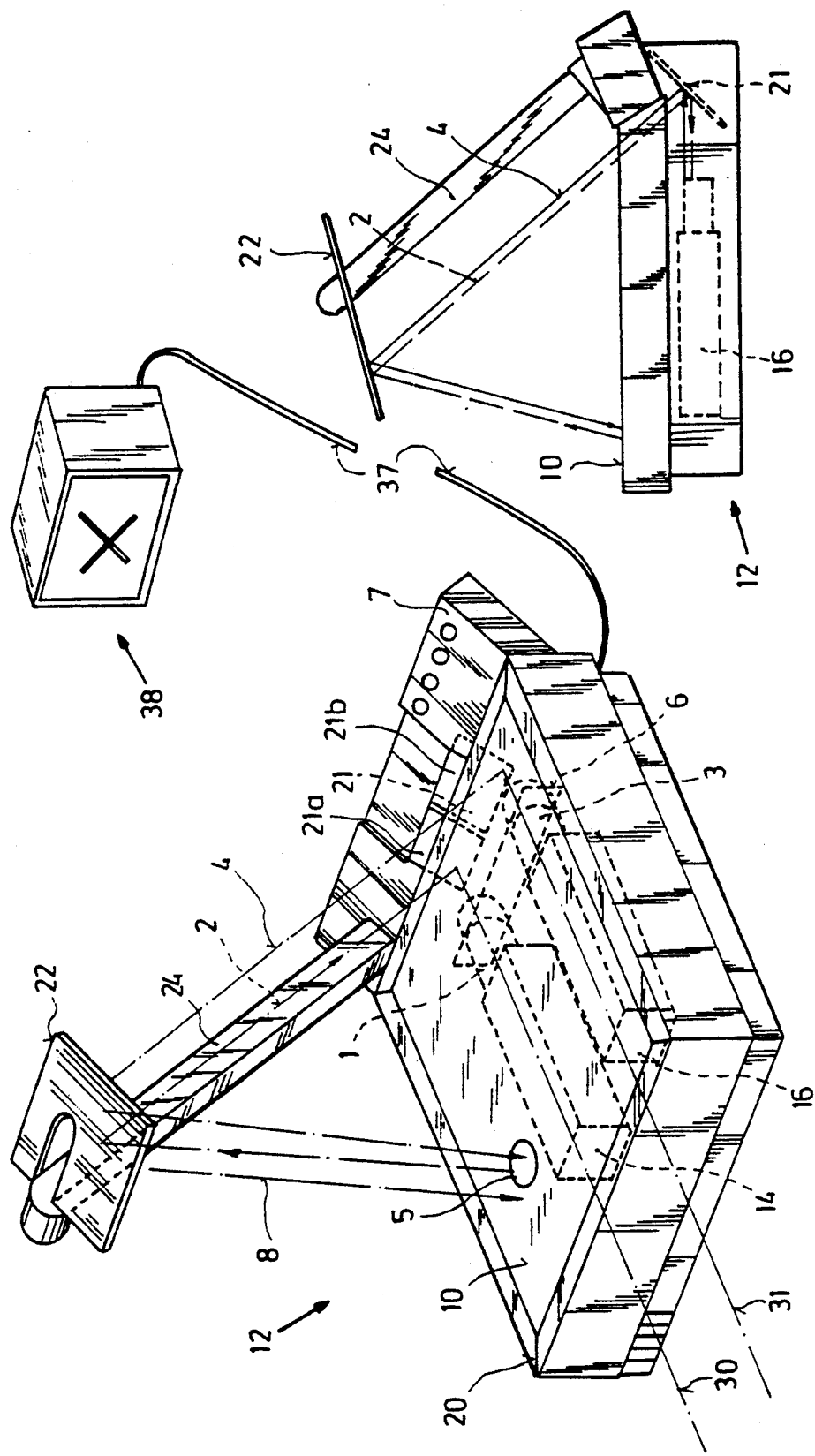
FIGS. 1 and 2 show an oblique view of an apparatus.

FIGS. 1 and 2 show an apparatus for recording pictures of a projection surface 10, having a light source 16 contained in a housing 12. The housing 12 has a flat right parallelpiped shape and houses a camera 14 which records the pictures or articles represented or located, respectively, on the projection surface 10. The light source 16 is therefore a transmitter of light, while the camera 14 is a receiver. It can be seen that the cover side 20 of the housing 12 is in the form of a projection surface, and that the light emitted by the projector 16 is reflected onto the projection surface 10 via a mirror system consisting of the mirrors 21 and 22, which may also be divided (for example, 21a, 21b). If the projector 16 is used as a slide projector, an enlarged image is formed on the projection surface 10, which image is reflected into the lens of the camera 14 via the mirrors 22 and 21. If a picture or an article is placed on a projection surface, the projector 16 is used as an illuminating means. The light deflected by the original can be fed to the camera 14 by the mirror system. The mirror 22 is supported by a support 24 connected to the housing 12 and is rotatable about a ball-and-socket joint. The camera 14 and the projector 16 are arranged in the housing 12 in such a way that the optical axis 30 and 31 form an angle of a few degrees with one another. The camera 14 is connected to a monitor 38 via an electric cable 37. The particular advantage of the apparatus is that it can be miniaturized without the quality of the images displayed being adversely affected.

Figure 3:
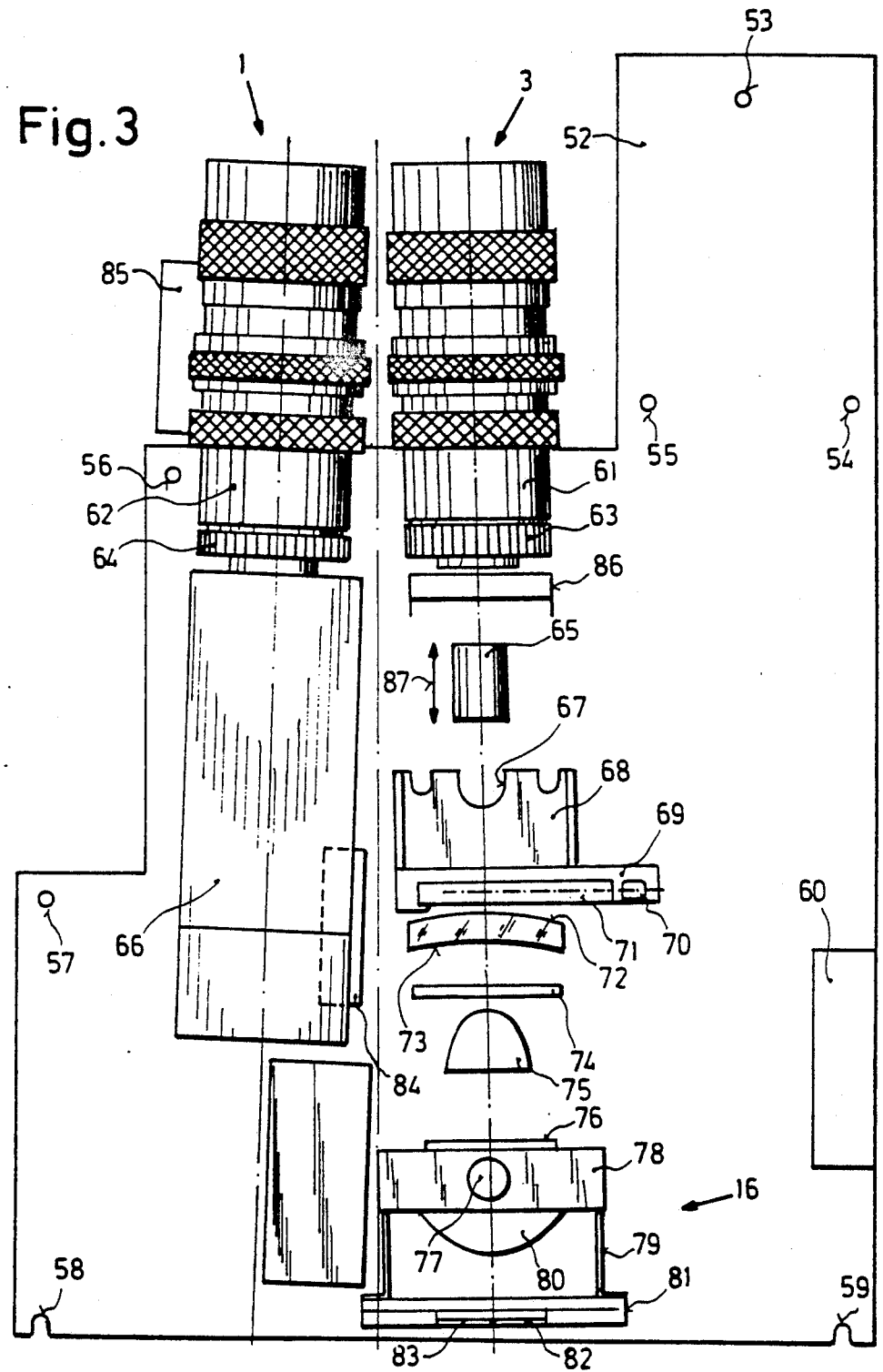
FIG. 3 shows a section with the lenses and
FIG. 4 shows an arrangement of the invention for a video telephone.

FIG. 3 shows the camera lens 1 and projector lens 3, which are arranged on a support plate 52. The support plate 52 is held firmly on the base of the housing 12 via baseplate fastenings 53 to 59. The camera lens 1 has a stationary lens part 62, while the projector lens has a stationary lens part 61.

Furthermore, rotation compensators 63 and 64 (through 350°) are provided for screw unions. A lens holder 86 is connected to the rotation compensator 63. An arrow 87 indicates the adjustability of the lens 65. Between this lens holder 86 and a slide tube 69 with a baseplate 68 and cut-outs 67 is a retrofocus optical projection system 65, which initially reduces the image of a slide to the size of the CCD in the video camera. The slide tube 69 carries a pushbutton 70 for slide ejection. A TV aperture 71 is arranged between the slide tube 69 and the lens having a convex form 72 and a concave form 73. The lens 72, 73, a heat filter 74 and a planar sphere 75 are used for collimating the light from the lamp. The total system of the lenses with the third lens 65 ensures that the filament of a lamp 77 cannot cause any imaging problems. The lamp 77 of the light source 16 is held by a lamp holder 78, which in turn is connected via a holding plate 79 to the baseplate 52. The back of the lamp 77 has a concave mirror 80 which serves as a reflector. The holding plate 79 also carries a printed circuit board 81 having a microswitch for lamp change and a switch lamp changer 82. Reference symbol 83 designates a lamp display. The rotation compensator 64 is connected to a CCD recording unit (camera) 66, which cooperates with a coupling for focus adjustment 84.

The camera lenses 1 and 3 are set synchronously by a motor/gear means 85 for IRIS/FOCUS/ZOOM. Cooling is provided by a fan 60.

Figure 4:
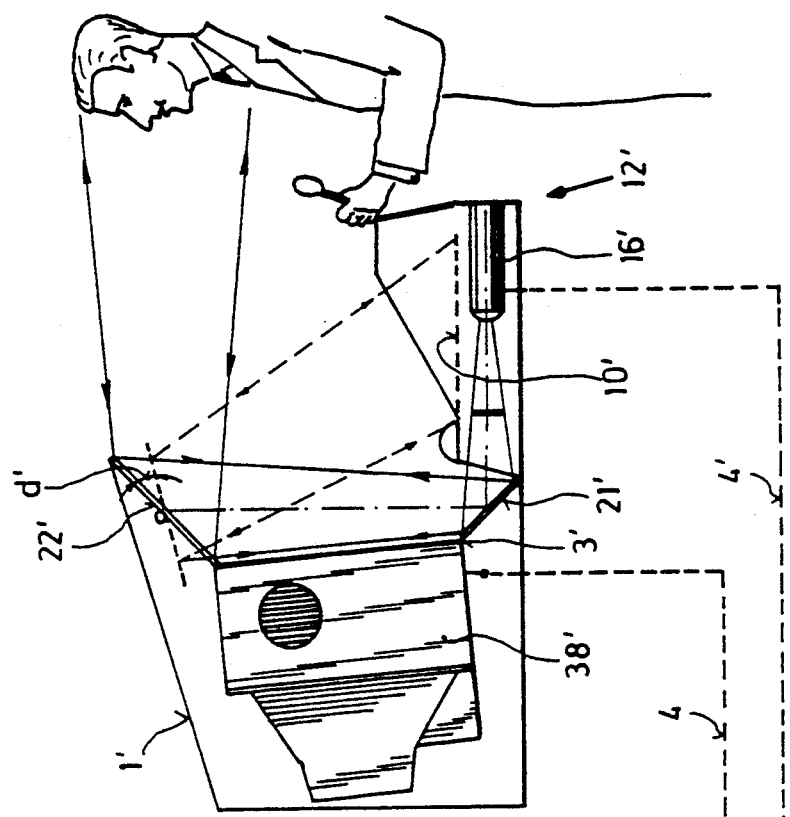
Figure 4:
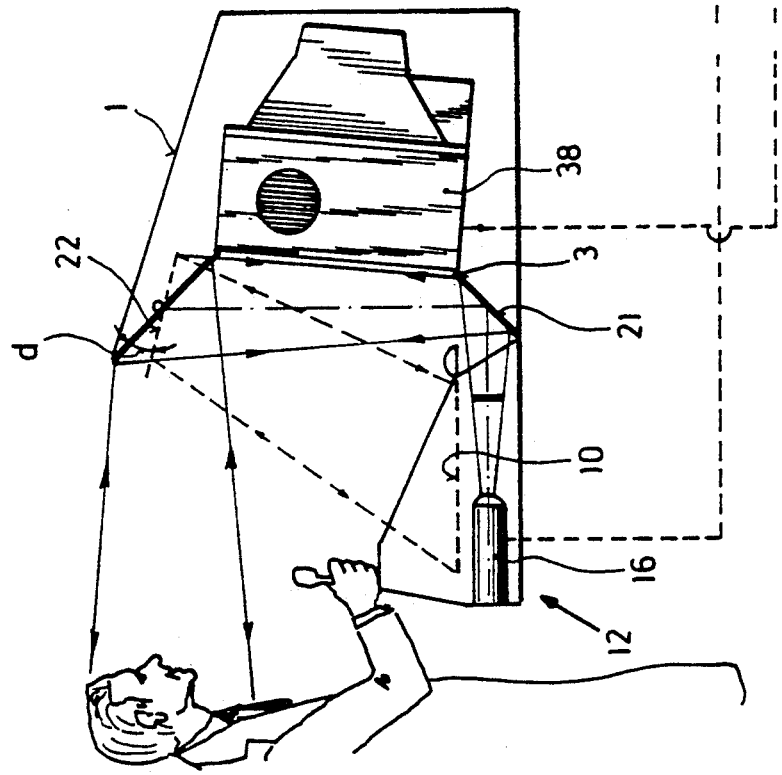

FIG. 4 shows two apparatus electrically connected to one another, in the form of video telephones. Each video telephone consists of an apparatus and a picture monitor 38, 38'; the audio means are not shown. The camera 14 of the first apparatus is connected to the monitor 38' of the second apparatus, and the camera 14' of the second apparatus is connected to the monitor 38 of the first apparatus. In the case of conference circuits, the plurality of video telephones can be connected simultaneously to one another. One of the most important advantages of the video telephone shown is that not only the user but also the article on the projection surface 10 or an image projected there can be displayed on the monitor 38, 38'. It is sufficient to swivel the mirror 22, 22' about its axis of rotation through an angle α, α'. The mirror 22 can be operated by means of a manipulator, which is not shown. Preferably, the mirror 22, 22' can also be swivelled so that it permits an image of the monitor 38, 38' to be displayed. If a flat monitor is used, the thickness of which is regularly only a few cm, it can be coupled by an articulated joint to the housing 12 of the apparatus, so that it can be swivelled from its ineffective (folded) position to its effective (swivelled out) position. It may be advantageous to connect the mirror 22, 22' by an articulated joint in the region of the upper edge of the monitor. If the fact that the mass of the components used can be very small is taken into account, it is possible to accommodate the video telephone in a small case. The monitor can of course also be connected to a personal computer. A decisive feature of this variant of the invention is that transmission of information is not restricted to playing back the image of the user. All articles present on the projection surface 10 or present elsewhere in the room can be picked up by the camera 14, 14' with the same precision and displayed on the monitor 38, 38'. If the ambient light is sufficient, the use of the light source or of the projector can also be dispensed with. The mirror 22, 22' can also be in the form of a half-silvered mirror and mounted directly in front of the monitor 38, 38'.

The apparatus according to the invention can also have a PC connection—in particular for red-green-blue color separation—on the video camera, so that the individual components can be processed separately, with the result that the image quality can be increased.

3D adjustability of the mirrors also includes their height adjustment.

What is claimed is:

1. Apparatus for converting an image into video signals, comprising:
   a projection surface for showing an image;
   a video camera having a recording field for taking said image and for converting it into video signals;
   first lens means for forming an image conjugated from that on siad projection surface onto said recording field of said video camera;
   a source of visible light for illuminating said projection surface;
   first mirror means in front of said video camera for deflecting a first beam of light having a first central ray reflected from said projection surface towards said video camera;
   second lens means arranged after said source of light for forming a second beam having central ray to be focused over a predetermined distance from said second lens means onto said projection surface;
   second mirror means between said first mirror means and said projection surface for receiving said second beam from said source of light via said first mirror means and for deflecting said second beam towards said projection surface, while receiving said first beam reflected from said projection surface and deflecting said first beam via said first mirror means towards said video camera; and
   means for adjustably mounting at least one of said first and second mirror means.

2. Apparatus as claimed in claim 1, wherein said first and second beams lie in a common plane and intersect one another at a point of intersection within a region of said projection surface at a predetermined angle of intersection of less than 25 degrees.

3. Apparatus as claimed in claim 2, wherein said angle of intersection is less than 5 degrees.

4. Apparatus as claimed in claim 3, wherein said angle of intersection is less than 2 degrees.

5. Apparatus as claimed in claim 1, wherein said first and second lens means have identical optical parameters.

6. Apparatus as claimed in claim 1, wherein said predetermined distance is at least 0.9 meters.

7. Apparatus as claimed in claim 1, further comprising aperture forming means between said light source and said second lens means for covering said recording field of said video camera by said conjugated image.

8. Apparatus as claimed in claim 7, wherein said aperture forming means comprise third lens means.

9. Apparatus as claimed in claim 8, further comprising light amplifier means.

10. Apparatus as claimed in claim 1, wherein at least one of said first and second lens means comprises adjustable focussing means.

11. Apparatus as claimed in claim 1, wherein at least one of said first and second lens means comprises zooming means.

12. Apparatus as claimed in claim 1, further comprising synchronizing means interconnecting said first and second lens means for synchronized adjustment of said first and second lens means.

13. Apparatus as claimed in claim 12, wherein said synchronizing means comprise gear means including a direction changing gear wheel.

14. Apparatus as claimed in claim 1, wherein said first mirror means comprise first and second mirror parts, said first mirror part receiving said first beam and said second mirror part receiving light from said light source.

15. Apparatus as claimed in claim 14, wherein said second mirror means and at least one of said mirror parts are adjustably mounted.

16. Apparatus as claimed in claim 15, further comprising remote conrol means for said second mirror means and at least one of said mirror parts.

17. Apparatus as claimed in claim 1, further comprising optical adjusting means.

18. Apparatus as claimed in claim 17, wherein said optical adjusting means comprise at least one means selected from the group consisting of an autofocus means, an auto-iris means, a measuring means for measuring statuses within a region of said protection surface, lens control means, control means for said source of light, and deflection control means.

19. Apparatus as claimed in claim 1, further comprising housing means enclosing at least said video camera, said light source and first mirror means, and mirror carrying means connected to said housing means and carrying said second mirror means, said projection surface being formed on said housing means.

20. Apparatus as claimed in claim 19, wherein said mirror carrying means comprise a telescopic arm.

21. Apparatus as claimed in claim 20, wherein said housing means comprise releasable fastening means for exchangeably holding said projection surface.

22. Apparatus as claimed in claim 1, further comprising holding means in the path of said second beam for holding a transparent image carrier to be illuminated by said second beam.

23. Apparatus as claimed in claim 1, further comprising a video monitor electrically connected to said video camera.

24. Apparatus as claimed in claim 23, further comprising housing means for enclosing at least part of said apparatus including said video camera, said light source and said first mirror means, and connecting them to said second mirror means and said projection surface, said video monitor being flat and being movably connected to said housing means to be moved between an operationg position and a rest position.

25. An appliance for commumication purposes comprising a first apparatus including:
 a projection surface for showing an image to be converted into video signals,
 a video camera having a recording field for taking said image and for converting it into video signals,
 first lens means for forming an image conjugated from that on said projection surface onto said recording field of said video camera,
 a source of visible light for illuminating said projection surface,
 first mirror means in front of said video camera for deflecting a first beam of light having a first central ray reflected from said projection surface towards said video camera,
 second lens means arranged after said source of light for forming a second beam having a second central ray to be focused over a predetermined distance from said second lens means onto said projection surface, and
 second mirror means between said first mirror means and said projection surface of receiving said second beam from said source of light via said first mirror means and for deflecting said second beam towards said projection surface, while receiving said first beam reflected from said projection surface and deflecting said first beam via said first mirror means towards said video camera,
 at least one of said first and second mirror means being adjustably mounted so as to be able to illuminate a user positioned in front of said first apparatus, said first apparatus further including a monitor; and
 a second apparatus identical with said first apparatus, wherein said video camera of said first apparatus is electrically connected to a monitor of said second apparatus, while a video camera of said second apparatus is electrically connected to said monitor of said first apparatus.

26. Appliance as claimed in claim 25, further comprising telephony-type coupling means for electrically connecting said first and second apparatuses.

* * * * *